United States Patent
Alshammari

(10) Patent No.: US 11,366,965 B1
(45) Date of Patent: Jun. 21, 2022

(54) SENTIMENT ANALYSIS USING BAG-OF-PHRASES FOR ARABIC TEXT DIALECTS

(71) Applicant: Jouf University, Sakaka (SA)

(72) Inventor: Hamoud H. Alshammari, Domat Aljandal (SA)

(73) Assignee: Jouf University, Sakaka (SA)

( * ) Notice: Subject to any disclaimer, the term of this patent is extended or adjusted under 35 U.S.C. 154(b) by 0 days.

(21) Appl. No.: 17/514,418

(22) Filed: Oct. 29, 2021

(51) Int. Cl.
*G06F 40/205* (2020.01)
*G06F 40/106* (2020.01)
*G06F 40/126* (2020.01)
*G06F 40/289* (2020.01)
*G06F 40/237* (2020.01)
*G06F 40/169* (2020.01)
*G06F 40/40* (2020.01)

(52) U.S. Cl.
CPC .......... *G06F 40/289* (2020.01); *G06F 40/169* (2020.01); *G06F 40/237* (2020.01); *G06F 40/40* (2020.01)

(58) Field of Classification Search
CPC ...................................................... G06F 40/00
See application file for complete search history.

(56) References Cited

U.S. PATENT DOCUMENTS

2015/0331785 A1* 11/2015 Schultz ................ G06F 40/106
717/125

FOREIGN PATENT DOCUMENTS

| CN | 109697232 B | * | 12/2020 | ........... G06F 40/126 |
| CN | 112860896 A | * | 5/2021 | |
| CN | 113591004 A | * | 11/2021 | |
| CN | 108647205 B | * | 2/2022 | ........... G06F 40/205 |
| WO | WO-2020199600 A1 | * | 10/2020 | ........... G06F 17/277 |

OTHER PUBLICATIONS

Al-Saqqa et al.; A survey of textual emotion detection, 2018 8th International Conference on Computer Science and Information Technolog; pp. 136-142 (Year: 2018).*

Khattak et al.; A survey on sentiment analysis in Urdu: A resource-poor language; Egyptian Informatics Journal 22; 2021; pp. 53-74 (Year: 2021).*

(Continued)

*Primary Examiner* — Shreyans A Patel
(74) *Attorney, Agent, or Firm* — Maier & Maier, PLLC

(57) ABSTRACT

A method for performing sentiment analysis on Arabic text may be described. Training text data may be preprocessed by removing non-Arabic characters, numbers, control characters or graphics. Since Arabic words may include the same letters but written in a different format, an embodiment may identify common letters and unify them in order to remove or avoid duplicates. An annotator may label portions of the data, such as words, terms, or phrases, as positive, negative. A lexicon may be formed based on the labeled training data. The bag-of-phrases may be formed from the training text data, which may be used to analyze the targeted data for sentiment. Based on the distribution of words or phrases, a sentiment may be formed indicating a sentiment of each portion of the target data.

9 Claims, 2 Drawing Sheets

(56) References Cited

OTHER PUBLICATIONS

Adbulla et al.; Arabic Sentiment Analysis: Lexicon-based and Corpus-based; 2013 IEEE Jordan Conference on Applied Electrical Engineering and Computing Technologies (AEECT); pp. 1-6 (Year: 2013).*

Al Sallab et al.; Deep Learning Models for Sentiment Analysis in Arabic; Proceedings of the Second Workshop on Arabic Natural Language Processing, pp. 9-17, Beijing, China, Jul. 26-31, 2015 (Year: 2015).*

Ihnaini et al.; Lexicon-Based Sentiment Analysis of Arabic Tweets: A Survey; Journal of Engineering and Applied Sciences Oct. 2018; pp. 7313-7322 (Year: 2018).*

* cited by examiner

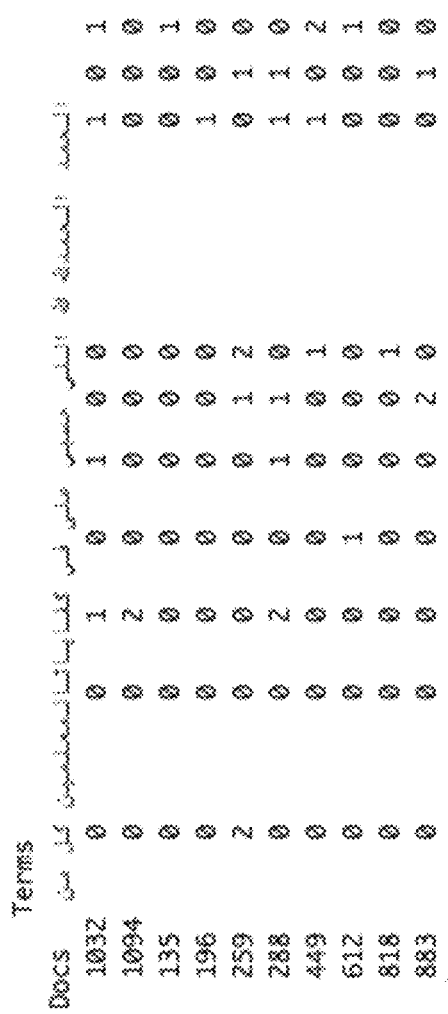

SENTIMENT ANALYSIS USING BAG-OF-PHRASES FOR ARABIC TEXT DIALECTS

FIELD

An exemplary embodiment relates to the field of sentiment analysis.

BACKGROUND

Sentiment analysis plays a major role in various text mining problems. However, there is a scarcity of research in the field of sentiment analysis for use in Arabic text. The Arabic language has multiple dialects used differently, for example, on social media. Thus, sentiment analysis of Arabic words creates a unique issue to be solved.

Subjective analysis provides insight into the subjective information found in the source material. For example, sentiment analysis might identify feelings associated with social media posts. Businesses can use sentiment analysis to identify and understand the social sentiment of their brand, product, or service by monitoring online conversations. A bag-of-words model used in natural language processing and information retrieval can represent text as a 'bag' or multiset of its words, sometimes disregarding grammar or word order.

Recently, Sentiment Analysis has played a major role in achieving different goals in many organizations. For example, businesses can use customer reviews to develop or improve their goods or services. Studies often rely on classifying text data based on two dimensions; either "yes or no", or three dimensions, such as positive, negative, or neutral. The data is typically sourced from social media applications such as Twitter, Facebook, YouTube, and the like.

A variety of factors and issues, such as the form of the data, the language of text data, etc., may determine the usefulness of sentiment analysis results. Therefore, the processing of Arabic text data may need present a more difficult challenge than processing English text data because of the language rules, the data availability in the Arabic language and the paucity of studies conducted and applied to the Arabic language sentiment analysis.

Different techniques that have been applied to processing Arabic text data include using the lexicon approach, Part of Speech (POS) approach, word2vec and others. However, there was a contrast between the results, which indicated the complexity of processing the Arabic text data. The contrast resulted from different reasons such as the private letter in Arabic and the language dialects. The complexity of working with the Arabic language arises because of the number of dialects, which are more than five main groups from more than 15 countries. In addition, the Arabic speaking people often use common phrases that express direct or opposite meaning. Also, there are some words whose meaning varies according to the context.

Text Sentiment Analysis focuses on exploring the meaning behind the text. Therefore, the accuracy of the results is related to the language and its meanings. In "Analyzing sentiments expressed on twitter by UK energy company consumers" (Ikoro 2018) the authors analyzed the opinions of consumers of an electricity company about its services. They applied a combination of two lexicons in a Twitter text dataset, as compared to the traditional way of having only one lexicon. Since they used the unsupervised learning algorithms to determine the results, there was not any training data or testing data. The results showed that the negative and neutral tweets about the services of the new energy companies are more than the positive opinions about the old ones.

SUMMARY

According to at least one exemplary embodiment, a method for implementing sentiment analysis on text may be shown and described. An exemplary embodiment may implement a bag-of-phrases model. The method may begin by receiving and storing training data. The training data may be text data. The training data may be compiled and pre-processed by removing non-Arabic characters, numbers, control characters or graphics. Since Arabic words may include the same letters but written in a different format, an exemplary embodiment may identify common letters and unify them in order to remove or avoid duplicates. Further, the unifying of letters may also identify the meaning of each of the letters identified to be the same and may ensure that none of the unified letters are of a different format but also have a different meaning.

An annotator may label portions of the data, such as words, terms, or phrases, as positive, negative. An exemplary embodiment may implement additional labels, such as clear positive, clear negative, or neutral. A lexicon may be formed based on the labeled training data. The target text data may then be analyzed, and a bag-of-phrases may be formed from the analyzed target text data. Based on the distribution of words or phrases, a sentiment may be formed indicating a sentiment of each portion of the target data

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 2 is an exemplary document-term matrix.

DETAILED DESCRIPTION

Figure 1:
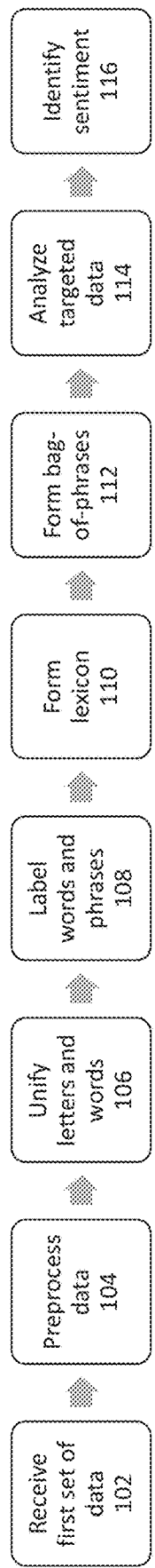
FIG. 1 is an exemplary schematic diagram of an exemplary process for identifying sentiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment may target text data which can include opinions regarding an issue, topic, product, or service. The target text data may be in Arabic. For example, people, sports club, ecommerce websites, or an employment exam may be studied. The data may be preprocessed to prepare it for analysis by, for example, removing duplicates and reformatting the data. In an exemplary embodiment, non-Arabic letters, numbers, control characters, and graphics may be removed from the data. Punctuation marks may be left in the data and used in the analysis.

The data may be normalized. In an exemplary embodiment, Arabic letters that come in different formats may be unified. For example, the Aleph letter can be written with a Hamzah (أ) or without (ا). Also, the letter "Ya" can have two dots (ي) or can be written without them (ى). However, some of these changes could affect the real meaning, and it is one of the complexities of working with Arabic text. The letters must thus be unified based on their accompanying context.

The data may be annotated, for example, to understand the sentences and meaning behind them, in what may be known as aspect level sentiment analysis. An exemplary embodiment may identify a lexicon to be a reference that contains not only the opinion words but also opinion phrases. For example, the data may be labeled based on a number of categories. An embodiment may implement five categories or labels: clear positive, clear negative, positive, negative, and neutral. The annotation may be carried out by, for example an annotator. The annotator may be an artificial intelligence or machine learning algorithm, neural network, expert system, or any other type of contemplated model. Further, it may be contemplated that the annotator is a human user which annotates the data.

Lexicons may be implemented or built to provide a high-level environment to process sentiments. However, typical lexicons often are built under specific circumstances or events as the data were collected using common keywords, and some lexicons have been built only for specific dialects or standard Arabic text. For clear positive and clear negative categories, the annotator may identify a set of positive words and a set of negative words. A positive bag-of-words (BOW) and negative BOW may be formed from words in clear positive and clear negative data. For example, an embodiment may extract 1-3 words from a file. Then, words from the remaining files may be compiled in one list with duplicated words removed.

The annotator may normalize the data during the annotation process to ensure that annotated words are accurately annotated based on errors that may be cause by the Hamza, dots, Madod, or the duplication of some letters for emphasis. For example, in the word (بجنن) which means (very nice), some people may duplicate the second to last letter several times, in the following way: (يجنننن) to show emphasis or more enthusiasm. Further, the context of words may be captured. For example, some Arabic words can have an opposite meaning depending on the context.

Positive and negative phrases may be identified and used to categorize data. Some phrases may offer or indicate not sentiments on their own but may express a sentiment when taken in context of a sentence or along with other phrases or words. Further, common names or adjectives may indicate a sentiment in their culture. Sentiment may be identified based on punctuation. For example, a question mark may indicate a neutral sentiment.

An exemplary embodiment may analyze initial results indicating statistics obtained from the first annotation which may be compared to results from, for example, machine learning or classification algorithms such as support vector machines (SVM), naïve Bayes, or any other contemplated classification algorithm. From the results, one or more common words may be identified which may be either positive or negative. It may be contemplated that the common words may be dependent on the topics, i.e., common positive words associated with sports may have a different connotation when associated with politics.

Phrases may be identified to analyze sentiment. An exemplary embodiment may create a bag-of-phrases for sentiment analysis, for example. The bag-of-phrases may be formed by the annotator by extracting words/phrases from the data. Words with clear meaning (such as a clear positive or clear negative meaning) may be placed into a bag-of-words list, and phrases with clear meaning identified by the annotator may be extracted from the data and placed in bag-of-phrases lists. The extraction may be performed manually or may be manually supervised in some exemplary embodiments.

One or more phrases may be identified along with a connotation associated with the phrases. A bag-of-phrases approach may differ from a bag-of-words approach in that certain phrases may have a connotation that is distinct from the connotation of the individual words. Further, an exemplary embodiment may analyze sentiment for a topic or issue over a period of time or at different times, such as in the beginning, middle, and/or end of a year. The bag-of-phrases approach may improve the performance of comparing sentiment across a period of time, as compared to traditional methods.

Multiple factors may indicate sentiment in data. For example, the nature of the issue or topic may influence the interpretation of some words or phrases. Further, the culture, language, and domain of the issue may also largely influence the sentiment. Thus, an exemplary embodiment may additionally identify the specific language or dialect, as well as an associated culture and/or domain associated with each portion of the data. A machine learning algorithm may be implemented to account for the factors. A document-term matrix may be formed to split the corpus of data into words, terms, or phrases and may identify an associated frequency in which the terms are found in the data. A classification algorithm such as, for example, a Naïve Bayes algorithm, may be implemented to examine and classify the data.

An exemplary bag-of-phrases model may allow data to be classified based on a variety of criteria, such as the field of the topic, a geographical area, an associated culture, and the like. Additionally, phrases may be identified which can be used to convey a positive and negative sentiment at the same time, such as "we accept that anyway". A slide window technique in a limited number of words may identify sentiment for some words. Some phrases may present sentiment directly based on the topic itself, such as commonly used phrases to indicate good or bad sentiment.

Sentiment may be identified based on the phrases or words identified in the target data. For example, an exemplary embodiment may process the target data to match words or phrases identified in the lexicon. Portions of the target data may be labeled as, for example, positive or negative. It may be contemplated that additional labels can be implemented, such as 'completely positive', 'completely negative', or 'neutral'. Words or phrases which are labeled as completely positive or completely negative may have a larger impact on the identification of sentiment on the target data, while neutral words or phrases may have less impact on the sentiment analysis.

Referring now to the exemplary embodiment in FIG. 1, FIG. 1 may illustrate an exemplary method of implementing a bag-of-phrases approach to sentiment analysis. The method may begin by receiving and storing a first set of data 102. The data may be text data. The first set of data may be compiled and preprocessed 104, such as by removing non-Arabic characters, numbers, control characters or graphics. Since Arabic words may include the same letters but written in a different format, an exemplary embodiment may identify common letters and unify them in order to remove or avoid duplicates 106. Further, the unifying of letters may also identify the meaning of each of the letters identified to be the same and may ensure that none of the unified letters are of a different format but also have a different meaning.

An annotator may label portions of the data, such as words, terms, or phrases, as positive, negative 108. An exemplary embodiment may implement additional labels, such as clear positive, clear negative, or neutral. A lexicon may be formed based on the labeled training data 110. Words and phrases may be extracted from the lexicon to form a bag-of-phrases 112. The data from the bag-of-phrases may then be used to analyse the targeted data 114. Based on the distribution of words or phrases within the bag-of-phrases, a sentiment may be formed indicating a sentiment of each portion of the target data 116.

The exemplary embodiment in FIG. 2 may illustrate a document-term matrix for one or more Arabic phrases found in one or more documents or portions of data.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for analyzing sentiment in text data, comprising:
    receiving and storing training data comprising a plurality of words;
    compiling the training data and removing one or more numbers, control characters, and graphics;
    identifying one or more same letters within the training data, wherein the same letters comprise letters with a same meaning and with a different format;
    identifying from the one or more same letters, and one or more same letters with a different format with a different meaning;
    unifying the one or more letters with a same meaning and a different formats;
    labeling, by an annotator, one or more phrases from the training data as positive, negative, or neutral;
    forming a lexicon based on the labeled one or more phrases, wherein the lexicon comprises a plurality of phrases and words labeled by the annotator, the lexicon comprising a set of positive words and phrases and a set of negative words and phrases;
    receiving a set of target data, the target data comprising target text data;
    forming a bag-of-phrases from the target data, the bag-of-phrases identifying a plurality of matched words or phrases from the target data, the matched words or phrases comprising words or phrases matching one or more words or phrases from the set of positive words and phrases and/or the set of negative words and phrases from the lexicon;
    identifying at least one sentiment associated with one or more portions of the target data based on the matched words or phrases.

2. The method for analyzing sentiment in text data of claim 1, wherein the training data comprises Arabic words.

3. The method for analyzing sentiment in text data of claim 2, wherein the removing comprises removing one or more of a hamza, dots, a Madod, or a duplicate letter.

4. The method for analyzing sentiment in text data of claim 1, wherein the labeling is executed by the annotator while labeling the one or more phrases.

5. The method for analyzing sentiment in text data of claim 1, wherein the annotator is a machine learning algorithm.

6. The method for analyzing sentiment in text data of claim 1, wherein the annotator is a human user.

7. The method for analyzing sentiment in text data of claim 1, further comprising identifying one or more of a geographic location, culture, or topic associated with each portion of the data, and wherein the labeling of the training data is based on the identified geographic location, culture, or topic.

8. The method for analyzing sentiment in text data of claim 1, wherein the sentiment is identified based on a quantity of positive words and phrases from the matched words and phrases or a quantity of negative words and phrases from the matched words and phrases.

9. The method for analyzing sentiment in text data of claim 1, further comprising forming a document-term matrix comprising one or more phrases from the target data, an identification of a plurality of documents where the one or more phrases are found, and a frequency of the one or more phrases in each of the plurality of documents.

* * * * *